C. L. VANDERLEY.
BEARING SUPPORT.
APPLICATION FILED SEPT. 13, 1918.

1,323,662.

Patented Dec. 2, 1919.

Inventor
Cornelius L. Vanderley
By Strong & Townsend
Attorneys

UNITED STATES PATENT OFFICE.

CORNELIUS L. VANDERLEY, OF SAN FRANCISCO, CALIFORNIA.

BEARING-SUPPORT.

1,323,662.  Specification of Letters Patent.  Patented Dec. 2, 1919.

Application filed September 13, 1918. Serial No. 253,979.

*To all whom it may concern:*

Be it known that I, CORNELIUS L. VANDERLEY, a citizen of the United States, residing at the city and in the county of San Francisco and State of California, have invented new and useful Improvements in Bearing-Supports, of which the following is a specification.

This invention relates to a bearing support.

It is desirable to provide certain bearings with adjustable supports. This is especially true of bearings carried in line shafts, and also bearings mounted within structures which may be distorted as is the case in ship construction.

It is the object of the present invention, therefore, to provide an adjustable bearing for receiving shafting, and, which may be delicately adjusted without the use of wood block backing, as is common, and without requiring the services of skilled mechanics to place the backing in position, and to properly aline the bearings within the shaft.

The present invention contemplates the use of guide brackets between which the base of the bearing may be slid, said base portion being engaged by adjustable screws which are fixed to a base plate or hanger bracket, and affords means for reciprocating the bearing along the slides and locking the same in position.

The invention is illustrated by way of example in the accompanying drawings in which—

Figure 1:
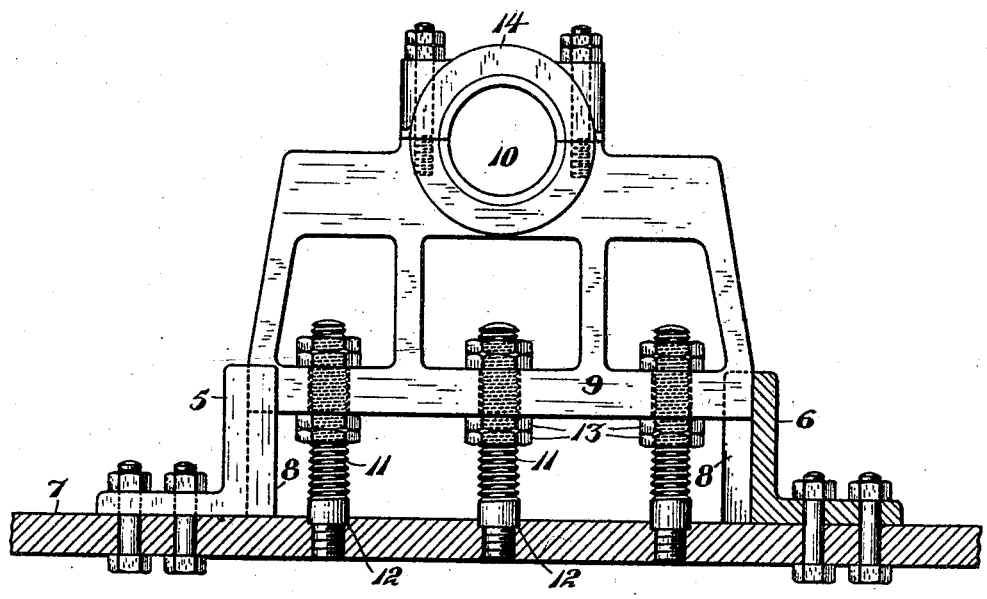
Figure 1 is a view in side elevation illustrating the complete bearing, and its support, and further discloses the parts broken away to more clearly indicate the structure.
Figure 2:
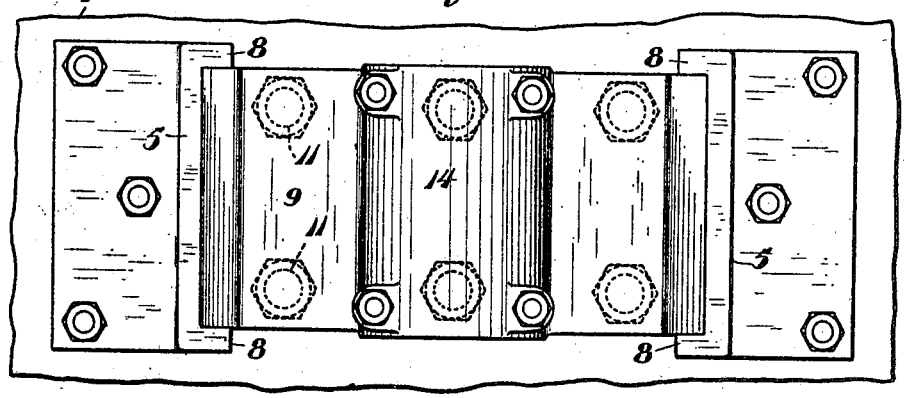
Fig. 2 is a view in plan illustrating the completely assembled bearing and support.

Referring more particularly to the drawings, 5 and 6 indicate angle guide plates which are here shown as bolted to a base plate or hanger 7. These guide plates are disposed with a bolting flange which coincides with the surface of the member 7 and outwardly extending ways preferably disposed at right angles to the bolting flanges. The ways are formed with flanges 8 at their opposite ends, said flanges being adapted to receive the base block 9 of the bearing structure. As shown in the drawings the base block is rectangular in shape, and thus may freely slide between the flanges 8 of the ways, and will, therefore, be held against longitudinal or lateral movement in relation to a line shaft 10, at the same time permitting transverse movement of the entire bearing as determined by the adjusting screws 11. These screws are suitably threaded into the sole plate 7, and are formed with shoulders 12 which lock against the shoulders in the sole plate which are formed by a counterboring operation. The main body of each screw extends outwardly at right angles from the sole plate and is threaded to receive sets of jam nuts 13. As particularly shown in Fig. 1, the lower portion of the bearing has been cored to form openings for the terminating ends of the adjusting screws, and also to form a plate through which the screws may extend. It will also be understood that the base member 9 of the bearing may be formed to accommodate one or more shafts, and that these shafts will be held in position by bearing caps 14 of common construction.

In operation the plate or hanger 7 is suitably anchored in a rigid manner, and the angle guides 5 and 6 are bolted thereto. The base portions 9 of the bearing may be then slid into the ways formed by the angle plates and may then receive the line shaft. By manipulating the various sets of jam nuts 13, the entire bearing may be moved toward or away from the base plate 7. When the bearing has been adjusted so that the line shaft is in proper alinement, the jam nuts may be locked at either side of the plate forming the bottom of the member 9, thus coöperating with the angle guides 5 and 6 to hold the bearing rigidly and against movement in any direction.

It will be thus seen that the bearing structure here disclosed, while simple in its construction, will afford adequate means for rigidly supporting the line shaft, and providing that it may be readily adjusted, said means being inexpensive in manufacturing cost and requiring small expense for labor and no expense for material in operation.

While I have shown the preferred form of my invention as now known to me, it will be understood that various changes in the combination, construction and arrangement of parts may be made by those skilled in the art without departing from the spirit of the invention as claimed.

Having thus described my invention, what

I claim and desire to secure by Letters Patent is:

1. A sole plate, angle plates bolted thereto, ways formed upon the opposing faces of said plates, a bearing block adapted to slide between said ways adjusting the screws fixed to the sole plate and extending partially between the ways to engage the bearing block, and adjusting means carried by said screws whereby the block is engaged and slidably adjusted between the ways and in relation to the sole plate.

2. A base plate, angle plates bolted thereto, ways formed upon the opposing faces of said plates, a bearing block adapted to slide between said ways, spaced adjusting screws fixed to said base plate between said ways and extending vertically therefrom, said bearing block being provided with passages at right angles to said adjusting screws, and openings between said passages and the bottom of said block, adapted to receive said adjusting screws, and adjusting means carried by said screws, whereby the block may be adjusted in relation to the base plate.

3. A base plate, angle plates bolted thereto, ways formed upon the opposing faces of said plates, a bearing block adapted to slide between said ways, spaced adjusting threaded bolts fixed to said base plate between said ways and extending vertically therefrom, said bearing block being provided with passages at right angles to said threaded bolts, and openings between said passages and the bottom of said block, adapted to receive said threaded bolts, and adjustable lock nuts carried by said screws, whereby the block may be adjusted in relation to the base plate.

In testimony whereof I have hereunto set my hand in the presence of two subscribing witnesses.

CORNELIUS L. VANDERLEY.

Witnesses:
NITA STACKS,
MABEL A. COX.